(12) United States Patent
Zhu et al.

(10) Patent No.: US 11,980,859 B2
(45) Date of Patent: May 14, 2024

(54) POWDER ROTARY FLUIDIZATION DEVICE AND METHOD THEREOF

(71) Applicant: Suzhou Inhal Pharma Co., Ltd., Suzhou (CN)

(72) Inventors: Jingxu Zhu, Suzhou (CN); Yingliang Ma, Suzhou (CN); Kaiqi Shi, Suzhou (CN); Jianhui Liu, Suzhou (CN); Hang Zhou, Suzhou (CN); Jiale Chen, Suzhou (CN)

(73) Assignee: Suzhou Inhal Pharma Co., Ltd., Suzhou (CN)

( * ) Notice: Subject to any disclaimer, the term of this patent is extended or adjusted under 35 U.S.C. 154(b) by 0 days.

(21) Appl. No.: 18/328,770

(22) Filed: Jun. 4, 2023

(65) Prior Publication Data
US 2024/0066480 A1    Feb. 29, 2024

(30) Foreign Application Priority Data
Aug. 25, 2022    (CN) .......................... 202211025774.0

(51) Int. Cl.
*B01F 33/40*    (2022.01)
*B01F 23/60*    (2022.01)
(Continued)

(52) U.S. Cl.
CPC ............ *B01F 33/405* (2022.01); *B01F 23/69* (2022.01); *B01F 33/4021* (2022.01);
(Continued)

(58) Field of Classification Search
CPC .... B01F 33/405; B01F 23/69; B01F 33/4021; B01F 33/409; B01F 35/187; B01F 35/33; B01F 2035/352; B01F 2101/22
(Continued)

(56) References Cited

U.S. PATENT DOCUMENTS 4,179,220 A * 12/1979 Rippon ................. C02F 3/1284
366/280
2004/0168342 A1    9/2004 Wakamatsu
(Continued)

FOREIGN PATENT DOCUMENTS

FR         2317069 A1 *  2/1977

OTHER PUBLICATIONS

CNIPA, Notification of First Office Action for CN202211025774.0, Feb. 3, 2023.
(Continued)

*Primary Examiner* — Charles Cooley

(57) ABSTRACT

A powder rotary fluidization device and a method thereof are provided. The powder rotary fluidization device includes a support device, the support device is provided with an installing plate, the installing plate is provided with a power device and a fluidization device, and the power device is in transmission connection with the fluidization device. After a position of the fluidization device on the installing plate is adjusted through the support device, the power device is started to drive the fluidization device to rotate, and meanwhile gases are introduced into the fluidization device to process powder. and therefore the problem of poor processing effect on fine powder with high viscosity is solved through the rotatable fluidization device.

9 Claims, 8 Drawing Sheets

(51) Int. Cl.
  *B01F 35/00* (2022.01)
  *B01F 35/30* (2022.01)
  *B01F 35/33* (2022.01)
  *B01F 101/22* (2022.01)
(52) U.S. Cl.
  CPC .......... *B01F 33/409* (2022.01); *B01F 35/187* (2022.01); *B01F 35/33* (2022.01); *B01F 2035/352* (2022.01); *B01F 2101/22* (2022.01)
(58) Field of Classification Search
  USPC .................................................. 366/102–104
  See application file for complete search history.

(56) References Cited

U.S. PATENT DOCUMENTS

| | | | |
|---|---|---|---|
| 2005/0145728 A1* | 7/2005 | Huttlin | B01J 8/386 241/18 |
| 2024/0066480 A1* | 2/2024 | Zhu | B01F 23/69 |

OTHER PUBLICATIONS

Suzhou Inhal Pharma Co., Ltd. (Applicant), Reply to Notification of First Office Action for CN202211025774.0, w/ replacement claims, Feb. 27, 2023.

Suzhou Inhal Pharma Co., Ltd. (Applicant), Supplemental Reply to Notification of First Office Action for CN202211025774.0, w/ (allowed) replacement claims, Mar. 28, 2023.

CNIPA, Notification to grant patent right for invention in CN202211025774.0, Apr. 9, 2023.

* cited by examiner

POWDER ROTARY FLUIDIZATION DEVICE AND METHOD THEREOF

TECHNICAL FIELD

The disclosure relates to the field of fluidization devices, and more particularly to a powder rotary fluidization device and a method thereof.

BACKGROUND

Some powder has loose properties and thus can flow freely. Some powder has strong adhesion and thus is easily to be adhered together so that is difficult to flow. The flowability of powder is one of important properties of powder, which is of great significance for pharmaceutical works. For example, powder packaging, capsule filling, tablet pressing and dosage distribution and the like are all affected by the flowability of powder. Only the powder flows, subsequent powder treatment processes such as mixing, drying, rounding, surface modification and the like can be carried out. An existing fluidized bed can solve some of problems associated with the flowability of powder, but has a poor effect for fine powder with high viscosity. Therefore, it is necessary to provide a powder rotary fluidization device and a method thereof, so as to solve at least some of the problems in related art.

SUMMARY

A series of simplified concepts are introduced in the summary section, which will be further described in detailed in embodiments of the disclosure. The summary of the disclosure is not intended to define key features and essential technical features of the claimed technical solution, nor is it intended to determine the scope of protection of the claimed technical solution.

In order to solve at least some of the above problems, embodiments of the disclosure provide a powder rotary fluidization device and a method thereof. The fluidization device includes a support device, the support device is provided thereon an installing plate, the installing plate is provided thereon a power device and a fluidization device, and the power device is in transmission connection with the fluidization device.

In an embodiment, the support device includes a base plate, two fixing plates, a reducer, and a rotating shaft. Multiple threaded rods are uniformly arranged on and connected to the base plate through threads, and bottom ends of the threaded rods are respectively provided with multiple installing seats. The two fixing plates are disposed in parallel on a top of the base plate. The reducer is disposed on a side of the fixing plates, and an input end of the reducer is connected with a rotating handle. An end of the rotating shaft is in damping connection with one of the two fixing plates, another end of the rotating shaft penetrates through the other one of the two fixing plates and is connected to an output end of the reducer, and the installing plate is fixedly sleeved on the rotating shaft.

In an embodiment, the fluidization device includes a rotating disc, a gas-flowing block, an intake pipe, a bearing seat and a fluidizer. The rotating disc is provided thereon an installing pipe. The gas-flowing block is sleeved on the installing pipe through an oil-free bearing, the gas-flowing block penetrates through the installing plate, the gas-flowing block is provided thereon a gas receiving groove and multiple gas outlet holes, and the gas-flowing block is abutted against to the rotating disc. An end of the intake pipe is in communication with the gas receiving groove, another end of the intake pipe penetrates through the installing plate, and the intake pipe is connected to the gas-flowing block through threads. The bearing seat is sleeved on the installing pipe through a bearing, the bearing seat is located on a side of the gas-flowing block facing away from the rotating disc, and the bearing seat is connected to the installing plate through a screw. The fluidizer is disposed on a side of the rotating disc facing away from the gas-flowing block.

In an embodiment, the fluidizer includes a cover plate, a sleeve, a filter cylinder, multiple stoppers and multiple gas-flowing devices. The cover plate is disposed parallel to a side of the rotating disc facing away from the gas-flowing block. The cover plate is connected to the rotating disc through the sleeve. The filter cylinder is disposed between the cover plate and the rotating disc, and the filter cylinder is disposed concentrically in the sleeve. The multiple stoppers are uniformly disposed on an inner wall of the sleeve, and the multiple stoppers in contact with an outer wall of the filter cylinder. The multiple gas-flowing devices are disposed on the rotating disc uniformly.

Each of the gas-flowing devices includes a first gas hole and a second gas hole. The first gas hole is defined on the rotating disc and near the gas-flowing block. The second gas hole is defined on the rotating disc, the second gas hole is located on a side of the first gas hole facing away from the gas-flowing block, the first gas hole is connected to the second gas hole through a connecting pipe, the connecting pipe is disposed in the rotating disc, and the second gas hole is located between the sleeve and the filter cylinder.

In an embodiment, the power device includes a U-shaped plate, a second transmission wheel and two fixing nuts. The U-shaped plate is fixedly disposed on the installing plate, a motor is fixedly disposed on the U-shaped plate, and an output shaft of the motor penetrates through the U-shaped plate and is connected to a first transmission wheel. The second transmission wheel is fixedly sleeved on the installing pipe, the second transmission wheel is located on a side of the bearing seat facing away from the rotating disc, and the second transmission wheel is connected to the first transmission wheel through a belt. The two fixing nuts are fixedly and threadedly connected to the installing pipe, and the two fixing nuts are located on a side of the second transmission wheel facing away from the bearing seat.

In an embodiment, a middle gas pipe is disposed on an inner wall of the installing pipe, and the middle gas pipe includes a first pipe and a second pipe. The first pipe is disposed on the inner wall of the installing pipe and is connected to a connecting block, and an outer wall of the connecting block is rotatably connected to the inner wall of the installing pipe. The second pipe is disposed on a side of the connecting block facing away from the first pipe, the second pipe is in communication with the first pipe, the second pipe is defined with multiple gas holes, and the second pipe is located in the filter cylinder.

In an embodiment, a top of the U-shaped plate is provided with a gas pipe bracket, and the middle gas pipe penetrates through the gas pipe bracket.

In an embodiment, the cover plate is provided therein a blocking device, and the blocking device includes a rotating chamber, a first rotating rod, and multiple blockers. The rotating chamber is disposed in the cover plate. An end of the first rotating rod is rotatably connected to an inner wall of the rotating chamber, another end of the first rotating rod penetrates through the cover plate, a first gear is sleeved on the first rotating rod, and the first gear is located in the rotating chamber. The multiple blockers are arranged around the rotating chamber uniformly.

Each of the blockers includes a transmission chamber, a gas exhaust rod, a second gear, a blocking plate, a gas exhaust chamber, a second rotating rod, a second gas exhaust hole, an L-shaped pipe and a conical block. The transmission chamber is disposed in the cover plate, the transmission chamber is located on a side of the rotating chamber and in communication with the rotating chamber. An end of the gas exhaust rod extends between the filter cylinder and the sleeve, another end of the gas exhaust rod penetrates through the cover plate, the gas exhaust rod penetrates through the transmission chamber, and an outer wall of the gas exhaust rod is provided with threads. The second gear is sleeved on the gas exhaust rod, the second gear is located in the transmission chamber, and the second gear is meshed with the first gear. The blocking plate is sleeved on and threadedly connected to the gas exhaust rod, the blocking plate is located between the filter cylinder and the sleeve, and the blocking plate is in contact with the inner wall of the sleeve and the outer wall of the filter cylinder individually. The gas exhaust chamber is disposed in the gas exhaust rod, a sliding plate is slidably disposed in the gas exhaust chamber, and the sliding plate is provided thereon a first gas exhaust hole. An end of the second rotating rod extends in the gas exhaust chamber and rotatably connected to a top of the sliding plate, and another end of the second rotating rod penetrates through the gas exhaust rod. The second gas exhaust hole is disposed on an inner wall of the gas exhaust chamber. An end of the L-shaped pipe is connected to a bottom of the inner wall of the gas exhaust chamber, and another end of the L-shaped pipe penetrates through the gas exhaust rod. The conical block is disposed in the gas exhaust chamber, a bottom of the conical block extends in the L-shaped pipe, and a top of the conical block is connected to a bottom of the sliding plate through a gas exhaust spring.

In an embodiment, the sleeve is made of a nylon material.

A powder rotary fluidization method according to an embodiment of the disclosure, includes the following steps.

Step 1: adjusting the support device to make the fluidization device be positioned at an optimal angle through the installing plate, and placing powder to be processed in the filter cylinder of the fluidization device.

step 2: starting the power device to drive the fluidization device to rotate, introducing a gas into the fluidizer through the middle gas pipe and the intake pipe at the same time, and thereby processing the powder to be processed.

Compared with the related art, embodiments of the disclosure may at least include the following beneficial effects.

The powder rotary fluidization device and the method thereof described in the disclosure adjust a position of the fluidization device on the installing plate through the support device, start the power device to drive the fluidization device to rotate and meanwhile introduce gases into the fluidizer through the middle gas pipe and the intake pipe to process the powder to be processed, so that the problem of poor processing effect on fine powder with high viscosity can be solved through rotating of the fluidization device.

The disclosure provides a powder rotary fluidization device and a method thereof, some of other advantages, objectives and features of the disclosure will be embodied in the following description, and some of them will be understood by those skilled in the art through study and practice on the disclosure.

BRIEF DESCRIPTION OF DRAWINGS

The accompanying drawings are used to provide a further understanding of the disclosure and form a part of the specification, the drawings together with the embodiments of the disclosure are used to explain the disclosure and do not constitute a limitation of the disclosure. In the drawings.

Figure 1:
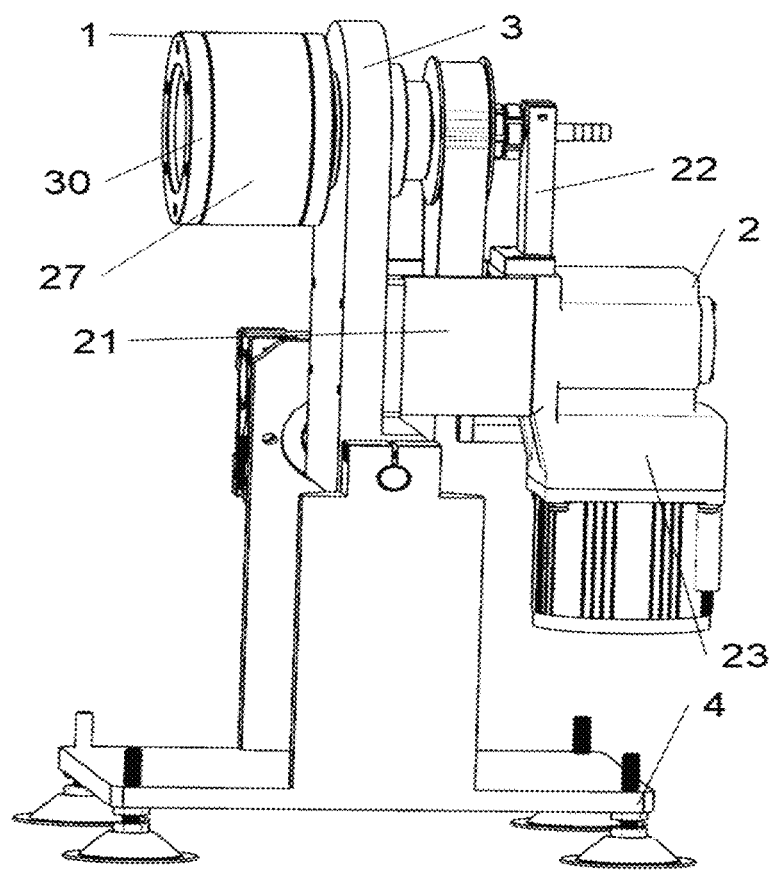
FIG. 1 illustrates a schematic structural diagram of a powder rotary fluidization device according to an embodiment of the disclosure.

Description of reference numerals: 1—fluidization device, 2—power device, 3—installing plate, 4—support device, 5—base plate, 6—installing seat, 7—fixing plate, 8—rotating shaft, 9—reducer; 10—threaded rod; 11—rotating disc; 12—installing pipe; 13—first air hole; 14—second air hole; 15—gas-flowing block; 16—bearing seat; 17—second transmission wheel; 18—intake pipe; 19—air-out hole; 20—gas receiving groove; 21—U-shaped plate; 22—air pipe bracket; 23—motor; 24—first transmission wheel; 25—belt; 26—fixing nut; 27—sleeve; 28—filter cylinder; 29—stopper; 30—cover plate; 31—middle gas pipe; 32—rotating handle; 33—first pipe; 34—connecting block; 35—second pipe; 36—rotating chamber; 37—transmission chamber; 38—first gear; 39—gas exhaust rod; 40—first rotating rod; 41—second gear; 42—blocking plate; 43—gas exhaust chamber; 44—second rotating rod; 45—sliding plate; 46—first gas exhaust hole; 47—second gas exhaust hole; 48—gas exhaust spring; 49—conical block; 50—L-shaped pipe.

DETAILED DESCRIPTION OF EMBODIMENTS

The following will provide a further detailed description of the disclosure in conjunction with the drawings and embodiments, so that those skilled in the art can refer to the text of the specification and implement it accordingly.

It should be understood that the terms "having", "containing", and "including" used in this specification do not exclude an existence or an addition of one or more other elements or combinations thereof.

Figure 2:
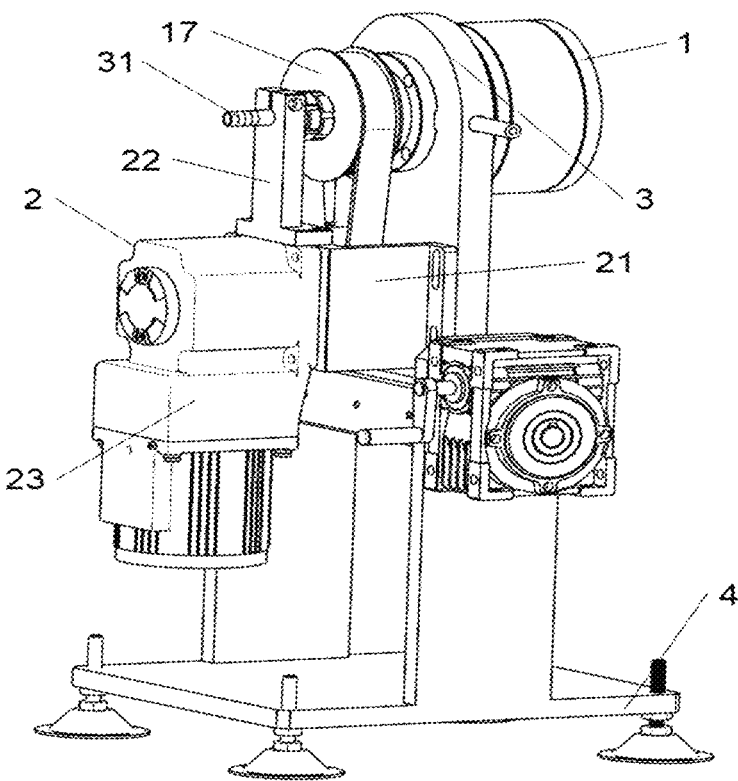
FIG. 2 illustrates a schematic structural diagram of the powder rotary fluidization device from another perspective according to an embodiment of the disclosure.
Figure 3:
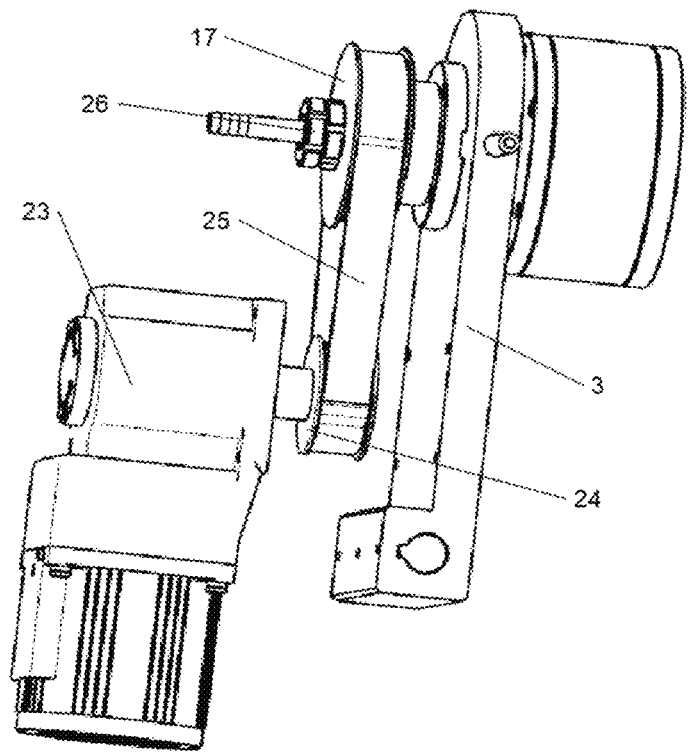
FIG. 3 illustrates a schematic partial structural diagram of the powder rotary fluidization device according to an embodiment of the disclosure.
Figure 4:
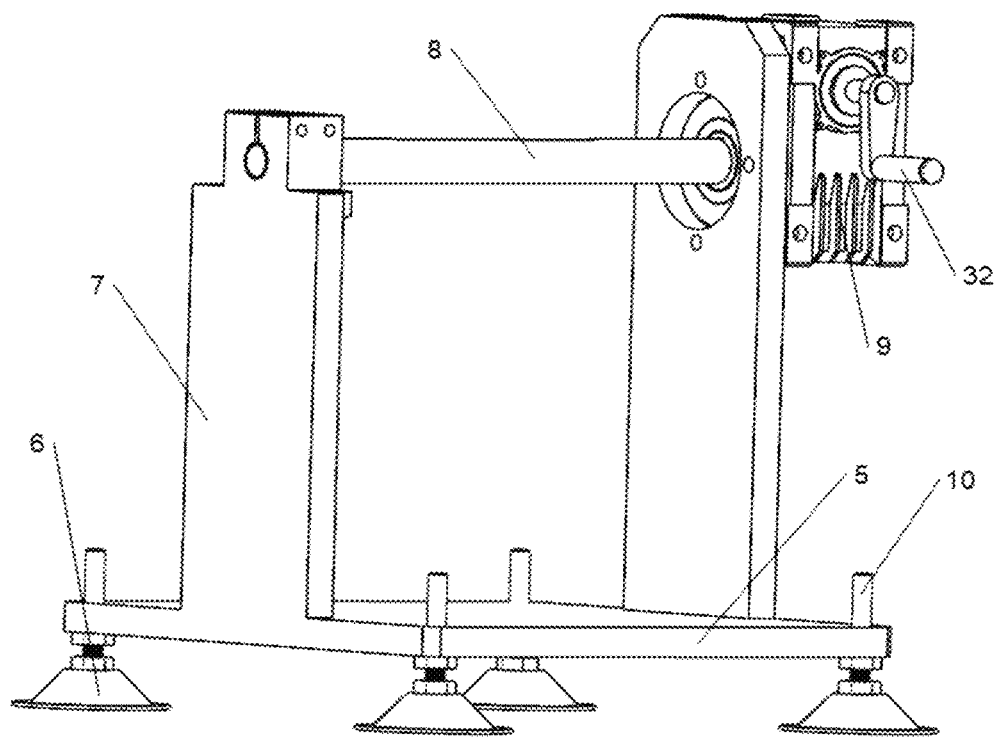
FIG. 4 illustrates a schematic structural diagram of a support device of the powder rotary fluidization device according to an embodiment of the disclosure.
Figure 5:
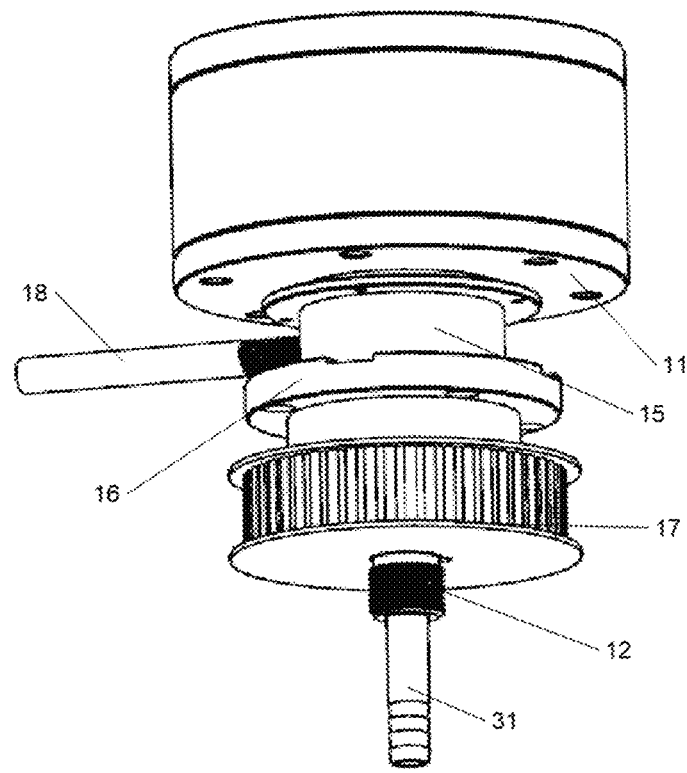
FIG. 5 illustrates a schematic structural diagram of a fluidization device of the powder rotary fluidization device according to an embodiment of the disclosure.
Figure 6:
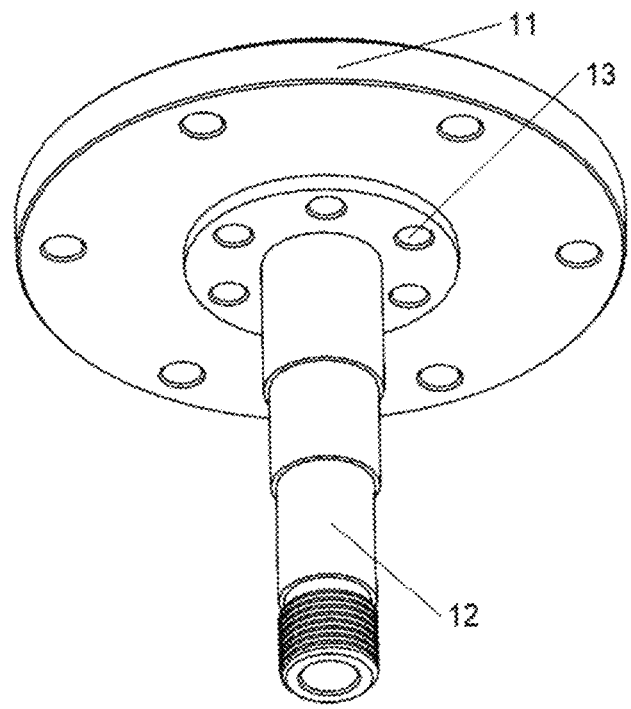
FIG. 6 illustrates a schematic structural diagram of a rotating disc of the powder rotary fluidization device according to an embodiment of the disclosure.
Figure 7:
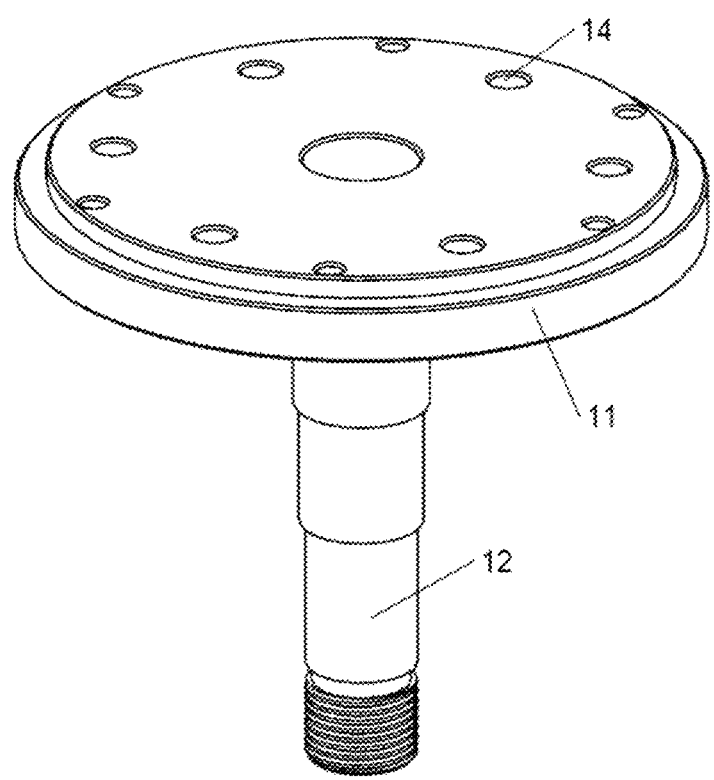
FIG. 7 illustrates a schematic structural diagram of the rotating disc of the powder rotary fluidization device from another perspective according to an embodiment of the disclosure.
Figure 8:
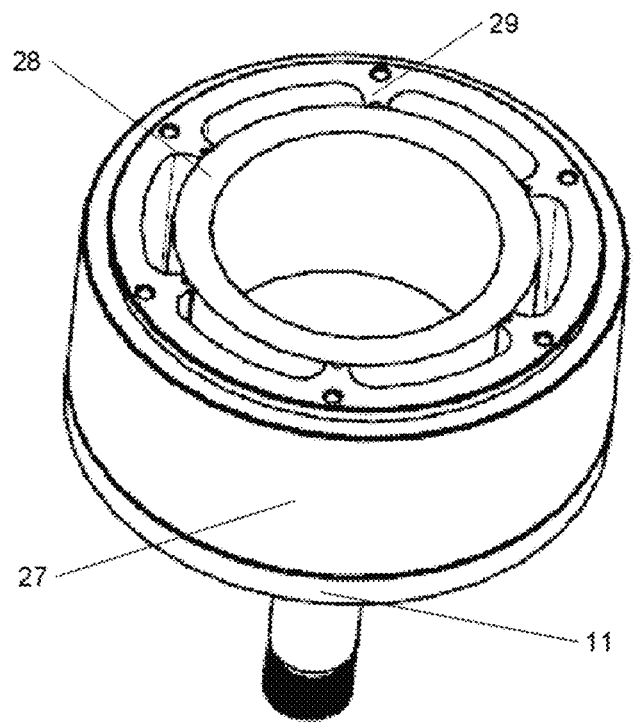
FIG. 8 illustrates a schematic structural diagram of a fluidizer of the powder rotary fluidization device according to an embodiment of the disclosure.
Figure 9:
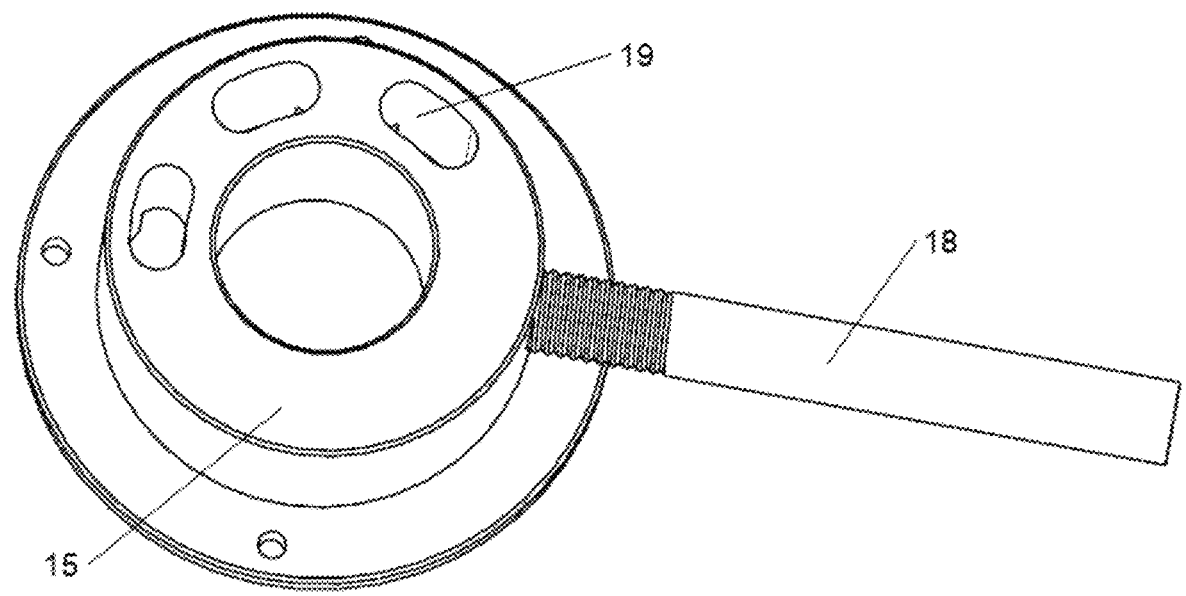
FIG. 9 illustrates a schematic structural diagram of a gas-flowing block of the powder rotary fluidization device according to an embodiment of the disclosure.
Figure 10:
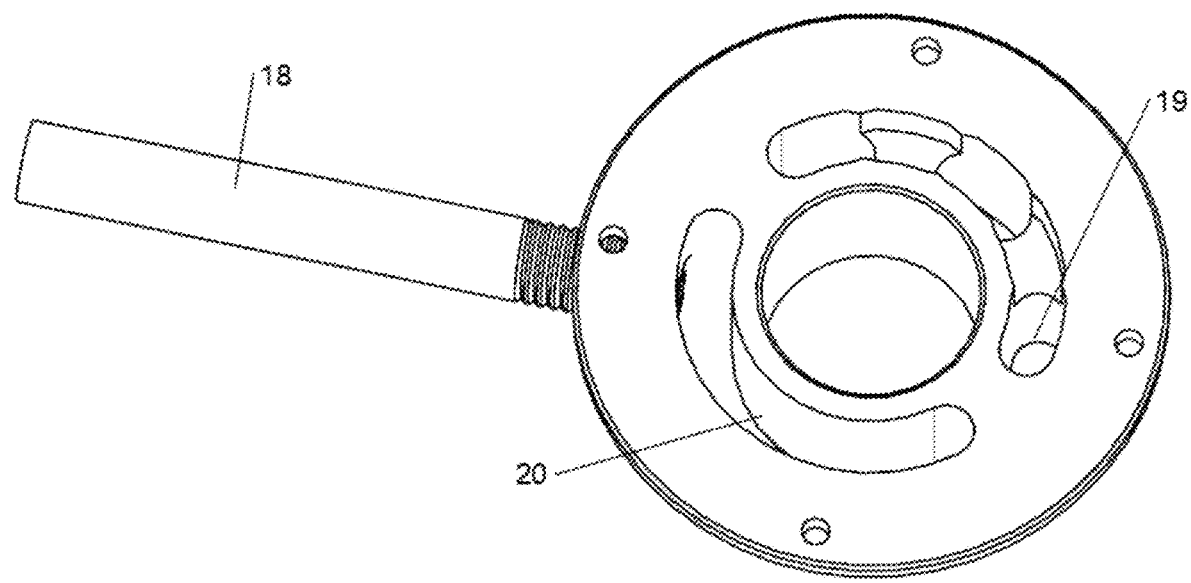
FIG. 10 illustrates a schematic structural diagram of the gas-flowing block of the powder rotary fluidization device from another perspective according to an embodiment of the disclosure.
Figure 11:
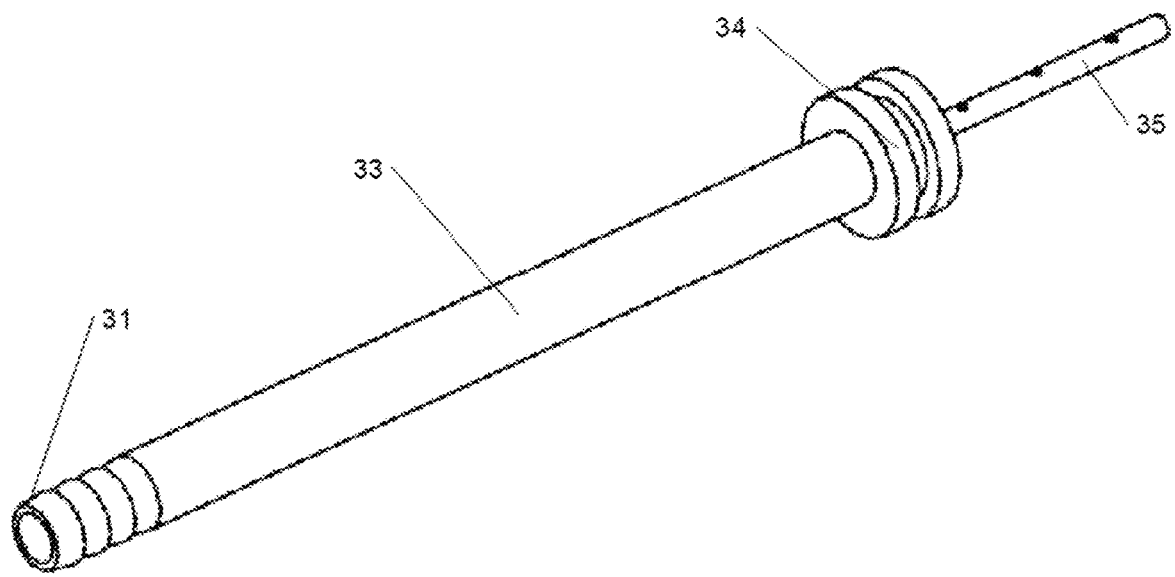
FIG. 11 illustrates a schematic structural diagram of a middle gas pipe of the powder rotary fluidization device according to an embodiment of the disclosure.
Figure 12:
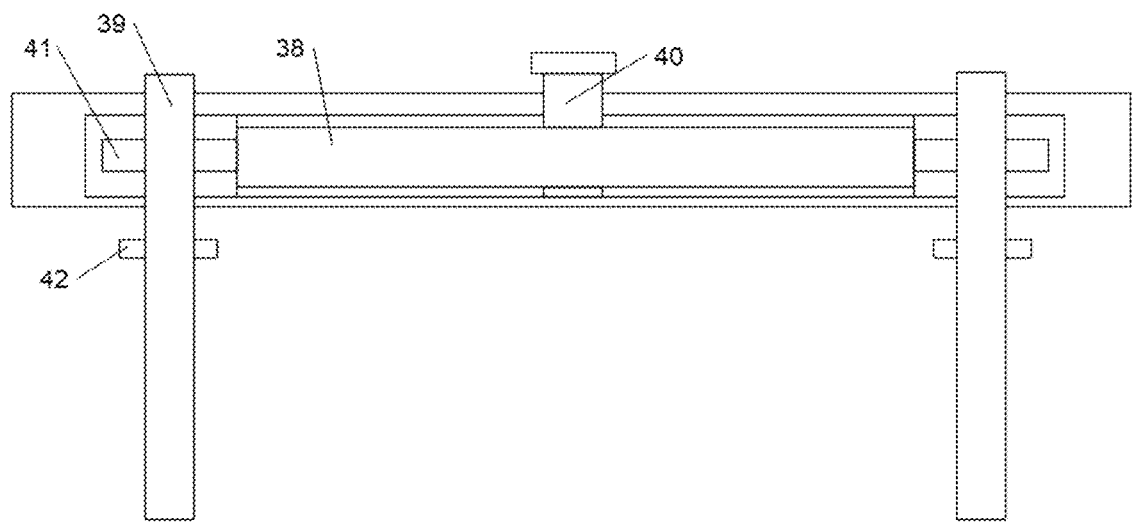
FIG. 12 illustrates a schematic structural diagram of a cover plate of the powder rotary fluidization device according to an embodiment of the disclosure.
Figure 13:
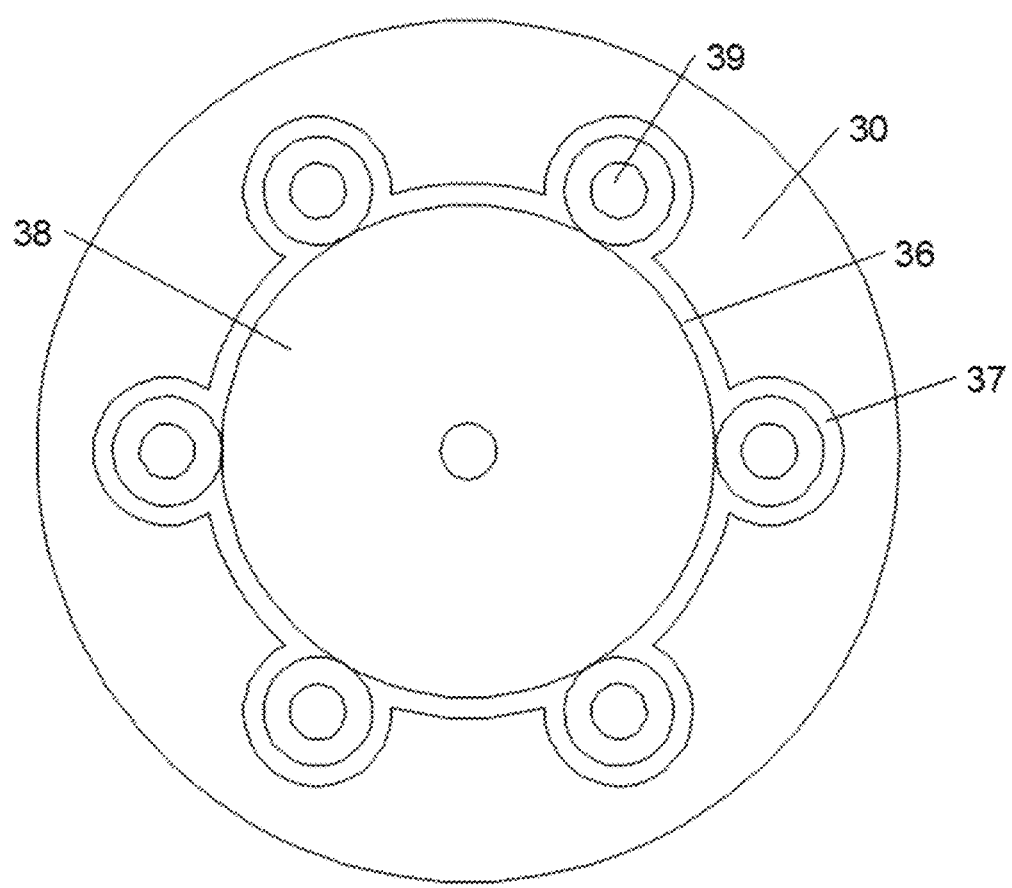
FIG. 13 illustrates a schematic structural diagram of a blocking device of the powder rotary fluidization device according to an embodiment of the disclosure.
Figure 14:
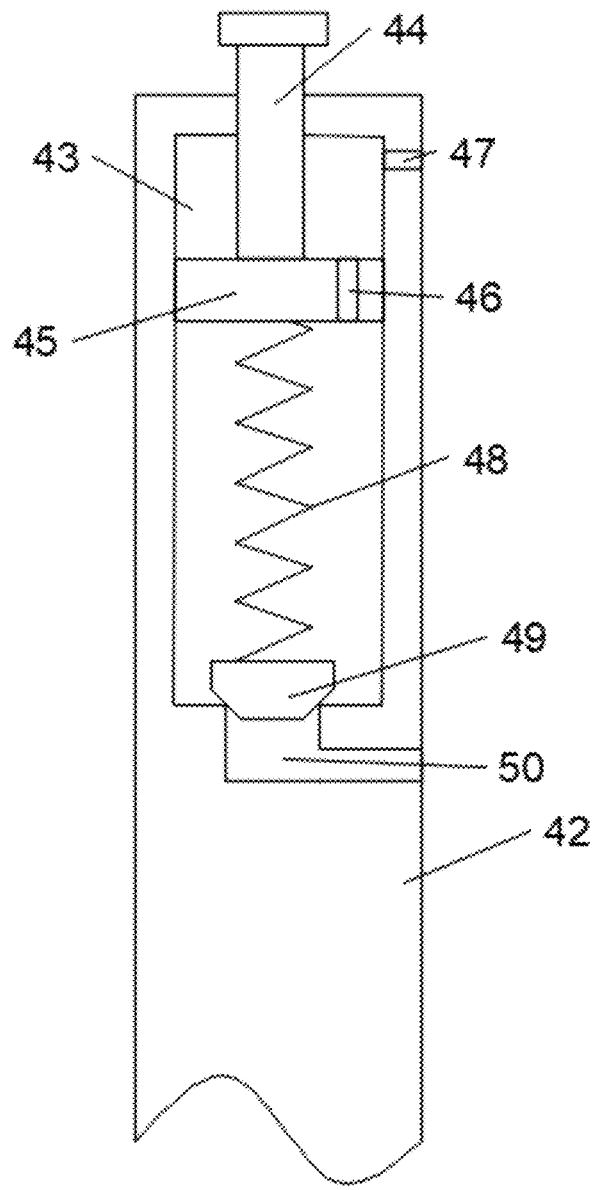
FIG. 14 illustrates a schematic structural diagram of a gas exhaust rod of the powder rotary fluidization device according to an embodiment of the disclosure.

As shown in FIG. 1 through FIG. 14, embodiments of the disclosure provide a powder rotary fluidization device and a method thereof. The fluidization device includes: a support device 4.

The support device 4 is provided thereon an installing plate 3, the installing plate 3 is provided thereon a power device 2 and a fluidization device 1, and the power device 2 is in transmission connection with the fluidization device 1.

A working principle and beneficial effects of the above technical solution are that: during actual use, after a position of the fluidization device 1 in the installing plate 3 is adjusted through the support device 4, the power device 2 is started, the fluidization device 1 is driven to rotate through the power device 2, air is introduced to the fluidization device 1 at the same time, the powder is processed, the problem of poor processing effect on fine powder with high viscosity is solved through the rotating fluidization device.

In an embodiment, the support device 4 includes a base plate 5, two fixing plates 7, a reducer 9 and a rotating shaft 8. Multiple threaded rods 10 are uniformly arranged on and connected to the base plate 5 through threads, and bottom ends of the threaded rods 10 are respectively provided with multiple installing seats 6. Two fixing plates 7 are disposed in parallel on a top of the base plate 5. The reducer 9 is disposed to a side of the fixing plates 7, and an input end of the reducer 9 is connected with a rotating handle 32. An end of the rotating shaft 8 is in damping connection with one of the two fixing plates 7, another end of the rotating shaft 8 penetrates through the other one of the two fixing plates 7 and is connected to an output end of the reducer 9, and the installing plate 3 is fixedly sleeved on the rotating shaft 8.

A working principle and beneficial effects of the above technical solution are that: during actual use, the base plate 5 is placed in a processing facility through the installing seats 6 and threaded rods 10, then the threaded rods 10 in four corners are rotated, the horizontal placement of the base plate 5 is completed through coordinating the threaded rods 10 and the installing seats 6. Then the rotating handle 32 is rotated, the rotating handle 32 drives the rotating shaft 8 to rotate through the reducer 9, the rotating shaft 8 drives the fluidization device 1 on the installing plate 3 to rotate and adjust the angle, the fine powder can be processed after completing the adjustment.

In an embodiment, the fluidization device 1 includes a rotating disc 11, a gas-flowing block 15, an intake pipe 18, a bearing seat 16 and a fluidizer. The rotating disc 11 is provided thereon an installing pipe 12. The gas-flowing block 15 is sleeved on the installing pipe 12 through an oil-free bearing, the gas-flowing block 15 penetrates through the installing plate 3, the gas-flowing block 15 is provided thereon a gas receiving groove 20 and multiple gas outlet holes 19, and the gas-flowing block 15 is abutted against to the rotating disc 11. An end of the intake pipe 18 is in communication with the gas receiving groove 20, another end of the intake pipe 18 penetrates through the installing plate 3, and the intake pipe 18 is connected to the gas-flowing block 15 through threads. The bearing seat 16 is sleeved on the installing pipe 12 through a bearing, the bearing seat 16 is located on a side of the gas-flowing block 15 facing away from the rotating disc 11, and the bearing seat 16 is connected to the installing plate 3 through a screw. The fluidizer is disposed on a side of the rotating disc 11 facing away from the gas-flowing block 15.

A working principle and beneficial effects of the above technical solution are that: during actual use, the power device 2 drives the installing pipe 12 to rotate, the installing pipe 12 drives the rotating disc 11 to rotate, the rotating disc 11 drives the fluidizer to rotate, the air is introduced into the gas receiving groove 20 through the intake pipe 18 at the same time, the air enters the fluidizer through the rotating disc 11, the fine powder in the fluidizer is processed, and the air enters the gas outlet holes 19 of the gas-flowing block 15 from the fluidizer through the rotating disc 11, the processing of the fine powder is completed. Moreover, due to the gas-flowing block 15 being fixed on the installing plate 3, the gas outlet holes 19 are disposed above the gas receiving groove 20, the air is made to enter from below the fluidizer, then the air leaves from above the fluidizer.

In an embodiment, the fluidizer includes a cover plate 30, a sleeve 27, a filter cylinder 28, multiple stoppers 29 and multiple gas-flowing devices. The cover plate 30 is disposed parallel to a side of the rotating disc 11 facing away from the gas-flowing block 15. The cover plate 30 is connected to the rotating disc 11 through the sleeve 27. The filter cylinder 28 is disposed between the cover plate 30 and the rotating disc 11, and the filter cylinder 28 is disposed concentrically in the sleeve 27. The multiple stoppers 29 are uniformly disposed on an inner wall of the sleeve 27, and the multiple stoppers 29 in contact with an outer wall of the filter cylinder 28. The multiple gas-flowing devices are disposed on the rotating disc 11 uniformly.

Each of the gas-flowing devices includes a first gas hole 13 and a second gas hole 14. The first gas hole 13 is defined on the rotating disc 11 and near the gas-flowing block 15. The second gas hole 14 is defined on the rotating disc 11, the second gas hole is located on a side of the first gas hole 13 facing away from the gas-flowing block 15, the first gas hole 13 is connected to the second gas hole 14 through a connecting pipe, the connecting pipe is disposed in the rotating disc 11, and the second gas hole 14 is located between the sleeve 27 and the filter cylinder 28.

A working principle and beneficial effects of the above technical solution are that: during actual use, after the air enters the gas receiving groove 20, due to the gas receiving groove 20 is disposed under the gas outlet holes 19, during rotation of the rotating disc 11, the air enters through the first gas holes 13 under the rotating disc 11, then the air comes out from the corresponding second gas holes 14 through the connecting pipe, so as to enter between the filter cylinder 28 and the sleeve 27. Due to the blocking effect of the stoppers 29, the air moves upwards and enters the filter cylinder 28 to process the fine powder, then the air enters between the filter cylinder 28 and the sleeve 27 again from above the filter cylinder 28, then the air enters the second gas holes 14 above, and the air leaves from the gas outlet holes 19 through the corresponding first gas holes 13. Due to rotation of the rotating disc 11, the first gas holes 13 are in contact with the gas receiving groove 20 and the gas outlet holes 19 are made to constantly change, however, the air always enters from below the filter cylinder 28 and leaves from above, so as to rotate and process the fine powder inside the filter cylinder 28, thus the problem of poor processing effect of high viscosity fine powder is solved. And the filter cylinder 28 is provided with multiple small holes, only air is allowed to pass, and the fine powder cannot pass through.

In an embodiment, the power device 2 includes a U-shaped plate 21, a second transmission wheel 17 and two fixing nuts 26. The U-shaped plate 21 is fixedly disposed on the installing plate 3, a motor 23 is fixedly disposed on the U-shaped plate 21, and an output shaft of the motor 23 penetrates through the U-shaped plate 21 and is connected to a first transmission wheel 24. The second transmission wheel 17 is fixedly sleeved on the installing pipe 12, the second transmission wheel 17 is located on a side of the bearing seat 16 facing away from the rotating disc 11, and the second transmission wheel 17 is connected to the first transmission wheel 24 through a belt 25. The two fixing nuts 26 are fixedly and threadedly connected to the installing pipe 12, and the two fixing nuts 26 are located on a side of the second transmission wheel 17 facing away from the bearing seat 16.

A working principle and beneficial effects of the above technical solution are that: during actual use, at the beginning of processing, the motor 23 is started, the motor 23 drives the first transmission wheel 24 to rotate, the first transmission wheel 24 drives the second transmission wheel 17 to rotate through the belt 25, the second transmission wheel 17 drives the installing pipe 12 to rotate, so as to drive the fluidization device 1 to rotate, the fine powder is processed.

In an embodiment, a middle gas pipe 31 is disposed on an inner wall of the installing pipe 12, and the middle gas pipe 31 includes a first pipe 33 and a second pipe 35. The first pipe 33 is disposed on the inner wall of the installing pipe 12 and is connected to a connecting block 34, and an outer wall of the connecting block 34 is rotatably connected to the inner wall of the installing pipe 12. The second pipe 35 is disposed on a side of the connecting block 34 facing away from the first pipe 33, the second pipe 35 is in communication with the first pipe 33, the second pipe 35 is defined with multiple gas holes, and the second pipe 35 is located in the filter cylinder 28.

A working principle and beneficial effects of the above technical solution are that: during actual use, at the processing of the fine powder, air can also be introduced into the filter cylinder 28 through the first pipe 33 and the second pipe 35 to process the fine powder, the fluidization device is made to process the fine powder through multiple airflows, the problem of poor processing effect of high viscosity fine powder is solved.

In an embodiment, a top of the U-shaped plate 21 is provided with a gas pipe bracket 22, and the middle gas pipe 31 penetrates through the gas pipe bracket 22.

A working principle and beneficial effects of the above technical solution are that: the pipe bracket 22 is set to install the middle gas pipe 31 more stable.

In an embodiment, the cover plate 30 is provided therein a blocking device, and the blocking device includes a rotating chamber 36, a first rotating rod 40 and multiple blockers. The rotating chamber 36 is disposed in the cover plate 30. An end of the first rotating rod 40 is rotatably connected to an inner wall of the rotating chamber 36, another end of the first rotating rod 40 penetrates through the cover plate 30, a first gear 38 is sleeved on the first rotating rod 40, and the first gear 38 is located in the rotating chamber 36. The multiple blockers are arranged around the rotating chamber 36 uniformly.

Each of the blockers includes a transmission chamber 37, a gas exhaust rod 39, a second gear 41, a blocking plate 42, a gas exhaust chamber 43, a second rotating rod 44, a second gas exhaust hole 47, an L-shaped pipe 50 and a conical block 49. The transmission chamber 37 is disposed in the cover plate 30, the transmission chamber 37 is located on a side of the rotating chamber 36 and in communication with the rotating chamber 36. An end of the gas exhaust rod 39 extends between the filter cylinder 28 and the sleeve 27, another end of the gas exhaust rod 39 penetrates through the cover plate 30, the gas exhaust rod 39 penetrates through the transmission chamber 37, and an outer wall of the gas exhaust rod 39 is provided with threads. The second gear 41 is sleeved on the gas exhaust rod 39, and the second gear 41 is located in the transmission chamber 37, and the second gear 41 is meshed the first gear 38. The blocking plate 42 is sleeved on and threadedly connected to the gas exhaust rod 39, the blocking plate 42 is located between the filter cylinder 28 and the sleeve 27, and the blocking plate 42 is in contact connected with the inner wall of the sleeve 27 and the outer wall of the filter cylinder 28 individually. The gas exhaust chamber 43 is disposed in the gas exhaust rod 39, a sliding plate 45 is slidably disposed in the gas exhaust chamber 43, and the sliding plate 45 is provided thereon a first gas exhaust hole 46. An end of the second rotating rod 44 extends in the gas exhaust chamber 43 and rotatably connected to a top of the sliding plate 45, and another end of the second rotating rod 44 penetrates through the gas exhaust rod 39. The second gas exhaust hole 47 is disposed on an inner wall of the gas exhaust chamber 43. An end of the L-shaped pipe 50 is connected to a bottom of the inner wall of the gas exhaust chamber 43, and another end of the L-shaped pipe 50 penetrates through the gas exhaust rod 42. The conical block 49 is disposed in the gas exhaust chamber 43, a bottom of the conical block 49 extends in the L-shaped pipe 50, and a top of the conical pipe 49 is connected to a bottom of the sliding plate 45 through a gas exhaust spring 48.

A working principle and beneficial effects of the above technical solution are that: during actual use, after introducing the fine powder into the filter cylinder 28, the cover plate 30 is installed. During installation, the blocking plates 42 are inserted between the filter cylinder 28 and the sleeve 27, then the cover plate 30 is fixed, the first rotating rod 40 is rotated to drive the first gear 38 to rotate, the first gear 38 drives the second gears 41 to rotate, the second gears 41 drive the gas exhaust rods 39 to rotate, and the gas exhaust rods 39 drive the blocking plates 42 to move on the inner wall of the filter cylinder 28 and the sleeve 27 through threads, dust adhered to the outer wall of the filter cylinder 28 is swept, the dust is discharged during use of the fluidizer, so as to avoid the dust abutted to the outer wall of the filter cylinder 28, affecting the air through the filter cylinder 28 to affect the treatment efficiency of the fine powder. During use, the first rotating rod 40 is rotated to make the blocking plates 42 abut against to the inner wall of the cover plate 30, contact positions between the filter cylinder 28 and the sleeve 27 and the cover plate 30 are closed to increase air tightness, so as to avoid waste caused by the fine powder entering between the filter cylinder 28 and the sleeve 27 through an edge of the filter cylinder 28. After completion of use, the blocking plates 42 are moved to a position abutted against to the rotating disc 11, and the second air hole 14 is closed, so as to avoid the dust entering the outer wall of the sleeve 27 through the gas outlet holes 19 and the connecting pipe when not in use. Moreover, during use, the second rotating rods 44 are rotated, positions of the second rotating rods 44 in the air-out cavities are adjusted, deformations of the gas exhaust spring 48 are adjusted, air pressure between the filter cylinder 28 and the sleeve 27 can be adjusted.

During a fluidization process, when the air pressure between the sleeve 27 and the filter cylinder 28 exceeds a preset value, the air enters from the L-shaped pipes 50, the conical blocks 49 are pushed and the air enters the gas exhaust chamber 43, then the air is discharged from the sleeve 27 through the first gas outlet holes 46 and the second gas outlet holes 47, so as to avoid excessive air pressure between the filter cylinder 28 and the sleeve 27 to cause deformation of the filter cylinder 28 and reduce the service life of the fluidizer.

In an embodiment, the sleeve is made of a nylon material.

A working principle and beneficial effects of the above technical solution are that: the nylon material has good corrosion resistance and toughness, which can improve the fluidization effect of the fine powder.

In an embodiment, the motor 23 is provided with a controller and an alarm, the installing pipe 12 is provided with a speed sensor, and the speed sensor and the alarm are both electrically connected to the controller, includes the following steps.

In a step 1, a current speed of the motor is calculated, and a calculation formula is as follows:

$$n = \frac{60x}{y}(1-d)$$

Where, n is the speed of the motor 23, x is a power supply frequency, y is a number of pole pairs of the motor 23, d is a slip ratio.

In a step 2, a speed value n a for the installing pipe 12 is obtained through the speed sensor. Then a speed loss coefficient during the rotation process is calculated, and a calculation formula is as follows:

$$L = \frac{nc - n_a}{nc}(e - e^\theta)$$

Where, L is the speed loss coefficient, c is a transmission ratio between the installing pipe 12 and the output shaft of the motor 23, θ is an average accuracy coefficient of the motor 23 and installing pipe 12, value ranges from 0-1, e is a natural constant, value is 2.72.

In a step 3, the obtained speed loss coefficient is compared with a preset speed loss coefficient, the controller controls the alarm to sound an alarm when the obtained speed loss coefficient is greater than the preset speed loss coefficient.

A working principle and beneficial effects of the above technical solution are that: the speed of the installing pipe 12 is real-time detected by setting the speed sensor, the loss of the speed during transmission is calculated and evaluated through calculating the speed of the dual-axis motor 23, when a degree of loss exceeds expectations, a transmission effect between the motor and the installing pipe is severely damaged, that is, the belt is severely worn, the controller controls the alarm to sound an alarm, staffs are reminded to replace the belt. system experience is optimized and intelligence of the device is increased through detecting the wear level of the belt and reminding timely maintenance.

An embodiment of the disclosure provides a powder rotary fluidization method, which may include the following step 1 and step 2.

In the step 1, the support device is adjusted to make the fluidization device be positioned at an optimal angle through the installing plate, powder to be processed is placed/loaded in the filter cylinder of the fluidization device.

In the step 2, the power device is started to drive the fluidization device to rotate and meanwhile gases are introduced into the fluidizer through the middle gas pipe and the intake pipe, and thereby the powder is processed.

A working principle and beneficial effects of the above technical solution are that: during actual use, the power device and the fluidization device are started to fluidize the fine powder after the fine powder to be processed is placed in the filter cylinder, and the air can be supplied simultaneously through the middle gas pipe and the intake pipe during the fluidization process, multiple airflow is used to fluidize and cooperated the fluidization device to rotate, so as to solve the flowability problem of easily agglomerated and viscous powder such as the fine powder.

In the description of the disclosure, it is necessary to understand that the terms "center", "longitudinal", "transverse", "length", "width", "thickness", "up", "down", "front", "back", "left", "right", "vertical", "horizontal", "top", "bottom", "inner", "outer", "clockwise", "anticlockwise", "axial", "radial", "circumferential" and the like indicate orientation or positional relationships based on the orientation or positional relationships shown in the accompanying drawings and are intended merely to facilitate the description of the disclosure, not to indicate or imply that the device or element referred thereto must have a particular orientation or be constructed and operated in a particular orientation, and therefore are not to be construed as limiting the disclosure.

In the disclosure, unless otherwise specified and limited, the terms "install", "couple", "connect", "fix" and other terms should be understood in a broad sense. For example, it can be a fixed connection, a detachable connection, or an integrally formed; it can be a mechanical connection, an electrical connection, or in communication with each other; It can be a direct connection or an indirect connection through an intermediate medium, which can be an internal communication between two components or an interaction relationship between two components, unless otherwise specified. For those skilled in the art, the specific meanings of the above terms in the disclosure can be understood based on specific circumstances.

Although various embodiments of the disclosure are disclosed as above, they are not limited to the applications listed in the specification and the embodiments. It can be applicable to various fields suitable for the disclosure. For those skilled in the art, additional modifications can be readily made. Therefore, without departing from general concepts defined by the appended claims and equivalent scopes thereof, the disclosure is not limited to specific details and the illustrations shown and described herein.

What is claimed is:

1. A powder rotary fluidization device, comprising:
a support device, wherein the support device is provided thereon an installing plate, the installing plate is provided thereon a power device and a fluidization device, and the power device is in transmission connection with the fluidization device;
wherein the fluidization device comprises:
a rotating disc, disposed on the installing plate; wherein the rotating disc is provided thereon an installing pipe;
a gas-flowing block, sleeved on the installing pipe through an oil-free bearing, wherein the gas-flowing block penetrates through the installing plate, the gas-flowing block is provided thereon a gas receiving groove and a plurality of gas outlet holes, and the gas-flowing block is abutted against the rotating disc;

an intake pipe, wherein an end of the intake pipe is in communication with the gas receiving groove, another end of the intake pipe penetrates through the installing plate, and the intake pipe is connected to the gas-flowing block through threads;

a bearing seat, sleeved on the installing pipe through a bearing, wherein the bearing seat is located on a side of the gas-flowing block facing away from the rotating disc, and the bearing seat is connected to the installing plate through a screw; and a fluidizer, disposed on a side of the rotating disc facing away from the gas-flowing block, and connected to the rotating disc.

2. The powder rotary fluidization device as claimed in claim 1, wherein the support device comprises:

a base plate, wherein a plurality of threaded rods are uniformly arranged on and connected to the base plate through threads, and bottom ends of the plurality of threaded rods are respectively provided with a plurality of installing seats;

two fixing plates, disposed in parallel on a top of the base plate;

a reducer, disposed on a side of the two fixing plates, wherein an input end of the reducer is connected with a rotating handle; and a rotating shaft, disposed above the base plate; wherein an end of the rotating shaft is in damping connection with one of the two fixing plates, another end of the rotating shaft penetrates through the other one of the two fixing plates and is connected to an output end of the reducer, and the installing plate is fixedly sleeved on the rotating shaft.

3. The powder rotary fluidization device as claimed in claim 1, wherein the fluidizer comprises:

a cover plate, disposed parallel to a side of the rotating disc facing away from the gas-flowing block;

a sleeve, disposed on a side of the rotating disc facing away from the gas-flowing block;

wherein the cover plate is connected to the rotating disc through the sleeve;

a filter cylinder, disposed between the cover plate and the rotating disc, wherein the filter cylinder is disposed concentrically in the sleeve;

a plurality of stoppers, uniformly disposed on an inner wall of the sleeve, wherein the plurality of stoppers are in contact with an outer wall of the filter cylinder; and a plurality of gas-flowing devices, disposed on the rotating disc uniformly, wherein each of the plurality of gas-flowing devices comprises:

a first gas hole, defined on the rotating disc and near the gas-flowing block; and a second gas hole, defined on the rotating disc, wherein the second gas hole is located on a side of the first gas hole facing away from the gas-flowing block, the first gas hole is connected to the second gas hole through a connecting pipe, the connecting pipe is disposed in the rotating disc, and the second gas hole is located between the sleeve and the filter cylinder.

4. The powder rotary fluidization device as claimed in claim 3, wherein the power device comprises:

a U-shaped plate, fixedly disposed on the installing plate, wherein a motor is fixedly disposed on the U-shaped plate, and an output shaft of the motor penetrates through the U-shaped plate and is connected to a first transmission wheel;

a second transmission wheel, fixedly sleeved on the installing pipe, wherein the second transmission wheel is located on a side of the bearing seat facing away from the rotating disc, and the second transmission wheel is connected to the first transmission wheel through a belt; and two fixing nuts, fixedly and threadedly connected to the installing pipe, wherein the two fixing nuts are located on a side of the second transmission wheel facing away from the bearing seat.

5. The powder rotary fluidization device as claimed in claim 4, wherein a middle gas pipe is disposed on an inner wall of the installing pipe, and the middle gas pipe comprises:

a first pipe, disposed on the inner wall of the installing pipe, wherein the first pipe is connected to a connecting block, and an outer wall of the connecting block is rotatably connected to the inner wall of the installing pipe; and a second pipe, disposed on a side of the connecting block facing away from the first pipe, wherein the second pipe is in communication with the first pipe, the second pipe is defined with a plurality of gas holes, and the second pipe is located in the filter cylinder.

6. The powder rotary fluidization device as claimed in claim 5, wherein a top of the U-shaped plate is provided with a gas pipe bracket, and the middle gas pipe penetrates through the gas pipe bracket.

7. The powder rotary fluidization device as claimed in claim 3, wherein the cover plate is provided therein a blocking device, and the blocking device comprises:

a rotating chamber, disposed in the cover plate;

a first rotating rod, wherein an end of the first rotating rod is rotatably connected to an inner wall of the rotating chamber, another end of the first rotating rod penetrates through the cover plate, a first gear is sleeved on the first rotating rod, and the first gear is located in the rotating chamber; and a plurality of blockers, arranged around the rotating chamber uniformly, wherein each of the plurality of blockers comprises:

a transmission chamber, disposed in the cover plate, wherein the transmission chamber is located on a side of the rotating chamber and in communication with the rotating chamber;

a gas exhaust rod, wherein an end of the gas exhaust rod extends between the filter cylinder and the sleeve, another end of the gas exhaust rod penetrates through the cover plate to the outside, the gas exhaust rod penetrates through the transmission chamber, and an outer wall of the gas exhaust rod is provided with threads;

a second gear, sleeved on the gas exhaust rod, wherein the second gear is located in the transmission chamber, and the second gear is meshed with the first gear;

a blocking plate, sleeved on and threadedly connected to the gas exhaust rod, wherein the blocking plate is located between the filter cylinder and the sleeve, and the blocking plate is in contact with the inner wall of the sleeve and the outer wall of the filter cylinder individually;

a gas exhaust chamber, disposed in the gas exhaust rod, wherein a sliding plate is slidably disposed in the gas exhaust chamber, and the sliding plate is provided thereon a first gas exhaust hole;

a second rotating rod, wherein an end of the second rotating rod extends in the gas exhaust chamber and rotatably connected to a top of the sliding plate, and another end of the second rotating rod penetrates through the gas exhaust rod;

a second gas exhaust hole, disposed on an inner wall of the gas exhaust chamber;

an L-shaped pipe, wherein an end of the L-shaped pipe is connected to a bottom of the inner wall of the gas exhaust chamber, and another end of the L-shaped pipe penetrates through the gas exhaust rod; and a conical block, disposed in the gas exhaust chamber, wherein a bottom of the conical block extends in the L-shaped pipe, and a top of the conical block is connected to a bottom of the sliding plate through a gas exhaust spring.

8. The powder rotary fluidization device as claimed in claim 3, wherein the sleeve is made of a nylon material.

9. A powder rotary fluidization method, adapted for the powder rotary fluidization device as claimed in claim 4, wherein the method comprises:

step 1: adjusting the support device to make the fluidization device be positioned at an optimal angle through the installing plate, and placing powder to be processed in the filter cylinder of the fluidization device; and step 2: starting the power device to drive the fluidization device to rotate, introducing gases into the fluidizer through a middle gas pipe and the intake pipe, and thereby processing the powder to be processed.

\* \* \* \* \*